US007998389B2

(12) United States Patent
Burchett et al.

(10) Patent No.: US 7,998,389 B2
(45) Date of Patent: Aug. 16, 2011

(54) METHOD FOR SEPTUMIZING INJECTION MOLDED THERMOPLASTIC CORE

(75) Inventors: Travis Joe Burchett, Derby, KS (US); Randall R. Clark, Wichita, KS (US); Randy R. Kysar, Derby, KS (US)

(73) Assignee: Spirit Aerosystems, Inc., Wichita, KS (US)

( * ) Notice: Subject to any disclaimer, the term of this patent is extended or adjusted under 35 U.S.C. 154(b) by 21 days.

(21) Appl. No.: 12/505,045

(22) Filed: Jul. 17, 2009

(65) Prior Publication Data

US 2011/0012290 A1    Jan. 20, 2011

(51) Int. Cl.
*B29C 45/14* (2006.01)

(52) U.S. Cl. ............ 264/251; 264/275; 264/328.1; 264/328.8; 264/248

(58) Field of Classification Search ................. None
See application file for complete search history.

(56) References Cited

U.S. PATENT DOCUMENTS

| 2,780,946 | A | * | 2/1957 | McGuire | 408/1 R |
|---|---|---|---|---|---|
| 2,903,388 | A | * | 9/1959 | Lintner et al. | 264/258 |
| 3,670,843 | A | * | 6/1972 | Kelly et al. | 181/292 |
| 3,864,196 | A | * | 2/1975 | Schmidt | 449/44 |
| 4,265,955 | A | * | 5/1981 | Harp et al. | 428/116 |
| 4,289,835 | A | * | 9/1981 | Lee et al. | 429/50 |
| 4,594,120 | A | * | 6/1986 | Bourland et al. | 156/155 |
| 4,971,746 | A | * | 11/1990 | Ferrer | 264/279 |
| 6,114,652 | A | | 9/2000 | Clarke et al. | |
| 6,387,200 | B1 | * | 5/2002 | Ashmead et al. | 156/79 |
| 6,547,295 | B2 | * | 4/2003 | Vismara | 293/133 |
| 7,074,287 | B2 | | 7/2006 | Belleguic et al. | |
| 7,666,341 | B2 | * | 2/2010 | Pearce | 264/328.11 |
| 2008/0075917 | A1 | * | 3/2008 | Park | 428/117 |
| 2009/0261493 | A1 | * | 10/2009 | Winget et al. | 264/39 |

FOREIGN PATENT DOCUMENTS

| JP | 03248835 | * 11/1991 |
|---|---|---|
| JP | 06126853 | * 5/1994 |

OTHER PUBLICATIONS

Machine translation of JP 06126853.*

* cited by examiner

*Primary Examiner* — Edmund H. Lee
(74) *Attorney, Agent, or Firm* — Hovey Williams LLP

(57) ABSTRACT

A method of fabricating and using a honeycomb core structure for aircrafts. The honeycomb core structure may comprise a septum positioned within and integral to a honeycomb core. The method may comprise sandwiching the septum between two sections of a die. Each section of the die may comprise a plurality of spaced apart columns, each having a hexagonal cross-section. The method may further comprise injecting melted thermoplastic throughout both sections of the die between the columns and cooling the thermoplastic, thereby hardening and integrating the thermoplastic and the septum together to form the honeycomb core structure. The method may also comprise affixing the honeycomb core structure within an aircraft structure to provide a structural load path for a primary component of the aircraft.

19 Claims, 2 Drawing Sheets

US 7,998,389 B2

METHOD FOR SEPTUMIZING INJECTION MOLDED THERMOPLASTIC CORE

BACKGROUND

1. Field

Embodiments of the present invention relate to methods and systems for manufacturing aircraft parts. More particularly, the invention relates to methods and systems for manufacturing a honeycomb core structure.

2. Related Art

Honeycomb cores are often used to strengthen aircraft parts. Particularly, honeycomb cores are often incorporated into aircraft parts in such a way as to provide a sufficiently strong load path for heavy components of the aircraft and/or components of the aircraft which experience high compression and shear forces.

In some applications, such as an engine nacelle or other applications requiring sound absorption, a double layer of honeycomb core is used, with a septum bonded between the two layers. This construction requires a multi-step process of first forming and hardening the honeycomb core, then bonding the two layers to the septum. It is difficult to precisely align the individual cells of the adjacent honeycomb layers. Furthermore, the bond lines between the septum and the honeycomb core degrade the strength of the sandwich structure.

Other types of honeycomb cores with acoustic septum press a single, pre-formed honeycomb core layer into a layer of liquid resin septum and an adjacent layer of wax-like material. The wax melts away and the liquid resin septum cools and hardens such that it bonds to cell walls of the honeycomb cores. This method overcomes the need to align individual cells of two honeycomb layers, and also eliminates the bond lines which can degrade the strength of the sandwich structure. However, this method still requires a two-step process in which the honeycomb core is first formed and hardened. Once the honeycomb is hardened, it is then joined with the septum, which is subsequently hardened against the hardened honeycomb cell walls. These two separate processes for first making the honeycomb core and then joining it with the septum can each be time- and labor-consuming and require separate tooling.

Accordingly, there is a need for an improved method of manufacturing a honeycomb core with an acoustic septum that does not suffer from the deficiencies of the prior art.

SUMMARY

Various embodiments of the invention provide a method of fabricating and using a honeycomb core structure for aircraft construction. The honeycomb core structure may comprise a septum and a honeycomb core. The septum may be positioned within and integral to a honeycomb core.

An embodiment of the honeycomb core may be comprised of a hardened thermoplastic resin, such as a liquid crystalline polymer. The thermoplastic resin may have a modulus greater than 3,000,000 pounds per square inch and a heat deflection temperature above 300 degrees Fahrenheit. The septum may be comprise of woven thermoplastic, metals, and/or cloth, among other suitable sound attenuating materials.

An embodiment of the method may comprise sandwiching a septum between two sections of a die. Each section of the die may comprise a base portion and a plurality of spaced apart columns extending from the base portion, each having a hexagonal cross-section. The base portions may be flat or substantially curved, having any shape known in the art.

The method may further comprise injecting melted thermoplastic throughout both sections of the die between the columns and cooling the thermoplastic, thereby hardening and integrating the thermoplastic and the septum together to form the honeycomb core structure. Finally, the method may comprise affixing the honeycomb core structure within an aircraft structure to provide a structural load path for a primary component of the aircraft.

This summary is provided to introduce a selection of concepts in a simplified form that are further described below in the detailed description. This summary is not intended to identify key features or essential features of the claimed subject matter, nor is it intended to be used to limit the scope of the claimed subject matter.

These and other important aspects of the present invention are described more fully in the detailed description below.

BRIEF DESCRIPTION OF THE DRAWINGS

Embodiments of the present invention are described in detail below with reference to the attached drawing figures, wherein.

Figure 1:
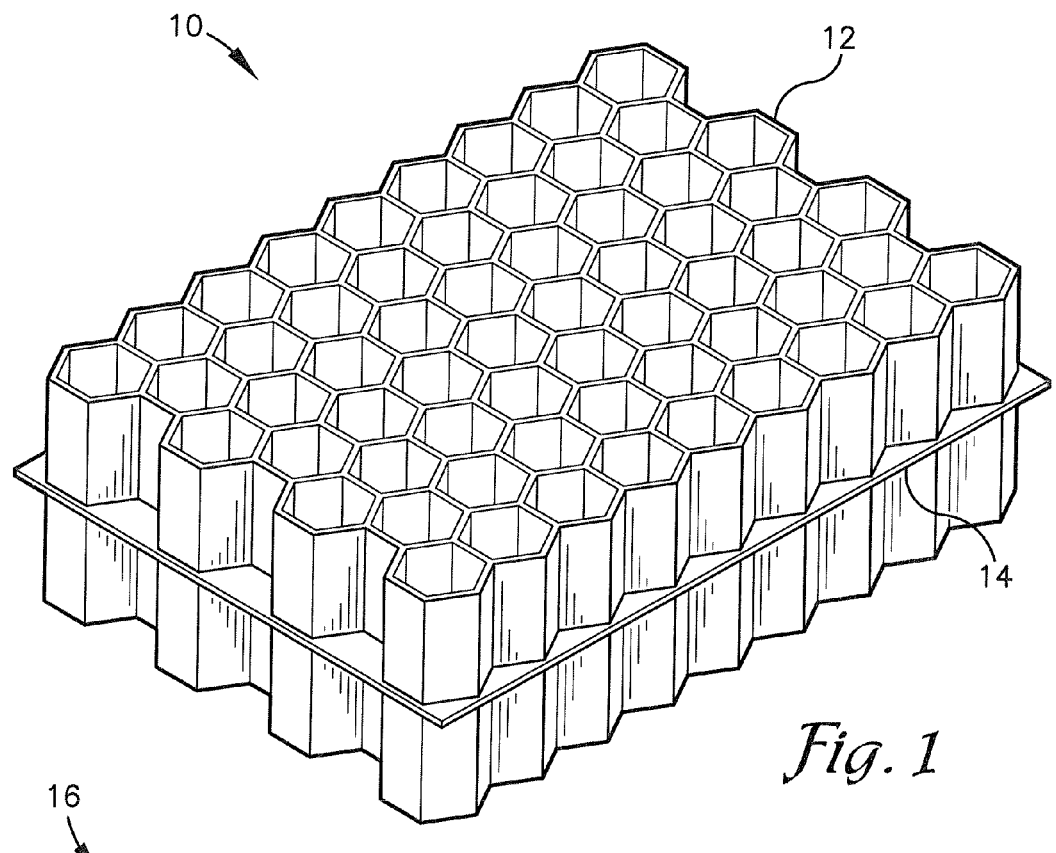
FIG. 1 is a perspective view of a honeycomb core structure constructed in accordance to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawing figures that illustrate specific embodiments in which the present invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense.

Embodiments of the present invention provide a method for forming and using a honeycomb core structure 10 comprising a honeycomb core 12 and an integrated septum 14, as illustrated in FIG. 1. The honeycomb core 12 may comprise hardened thermoplastic resin, such as a liquid crystalline polymer. The thermoplastic resin of the honeycomb core 12 may have a modulus greater than approximately 3MSI (3,000,000 PSI) and may have a heat deflection temperature (HDT) above approximately 300 degrees Fahrenheit.

The septum 14 may be a thin layer of material configured for substantially attenuating sound waves. For example, the septum 14 may comprise woven thermoplastic, metals, and/or cloth, among other suitable sound attenuating materials. In various embodiments of the structure 10, the septum 14 may have a thickness between approximately 0.001 inches and approximately 0.01 inches. Additionally, the septum 14 may have a lower melting temperature than the thermoplastic resin of the honeycomb core.

Figure 2:
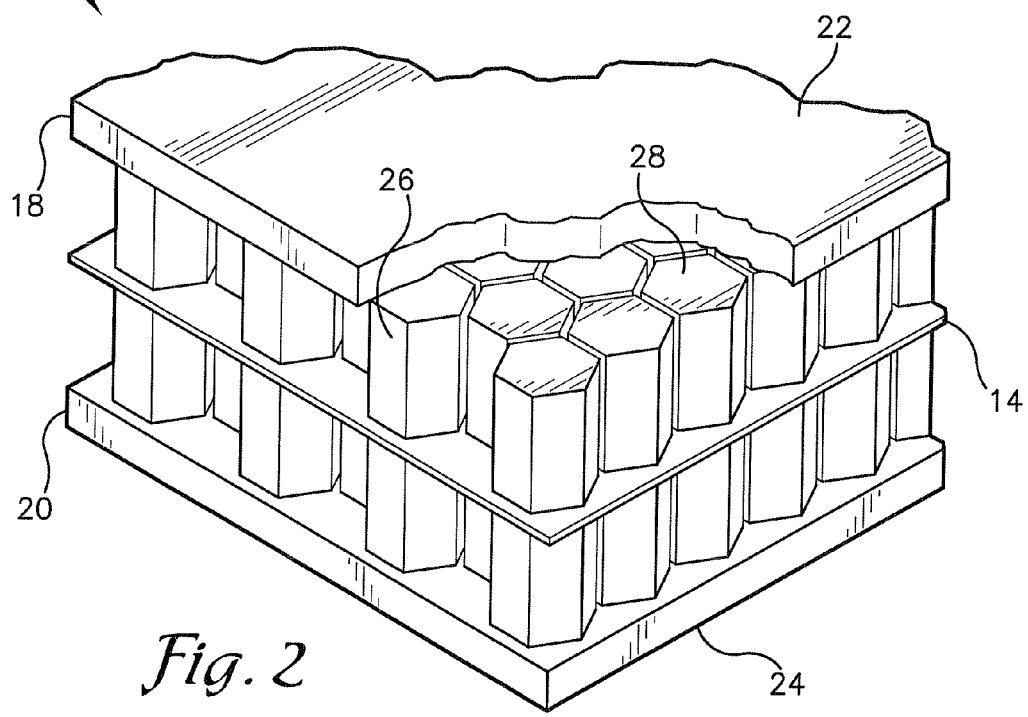
FIG. 2 is a fragmentary perspective view of two sections of a die having a septum sandwiched therebetween for use in the manufacture of the honeycomb core structure of FIG. 1.

FIG. 2 illustrates a die 16 for forming the honeycomb core structure 10. The die 16 may be made of a material with a melting point substantially higher than the melting point of the honeycomb core 12 and the melting point of the septum 14. The die 16 may comprise two sections 18,20, each section having a base portion 22,24 and a plurality of spaced apart columns 26 protruding from the base portion 22,24 and each having an end portion 28. The columns 26 may have any cross-sectional shape. However, in one embodiment of the invention, the columns 26 may have a substantially hexagonal cross-section.

The end portions 28 of the columns 26 of one of the sections 18 may match up with the end portions 28 of the columns 26 of the other of the sections 20 when the two sections 18,20 are joined together. For example, the die 16 may be formed as a single piece having a first and a second base portion 22,24 and a plurality of columns 26 extending from the first base portion 22 to the second base portion 24. Then the die 16 may be split into the two sections 18,20 by cutting horizontally through the columns 26.

Each of the columns 26 of the two sections 18,20 may be of uniform length or height. However, in various embodiments of the invention, the columns 26 may be of varying lengths or heights from other columns 26 of the die. The base portions 22,24 of the die 16 may be of a substantially flat configuration. However, in various embodiments of the invention, the base portions 22,24 may have a substantially curved surface from which the columns 26 extend or may be of any shape or configuration required for a particular aircraft part.

Figure 3:
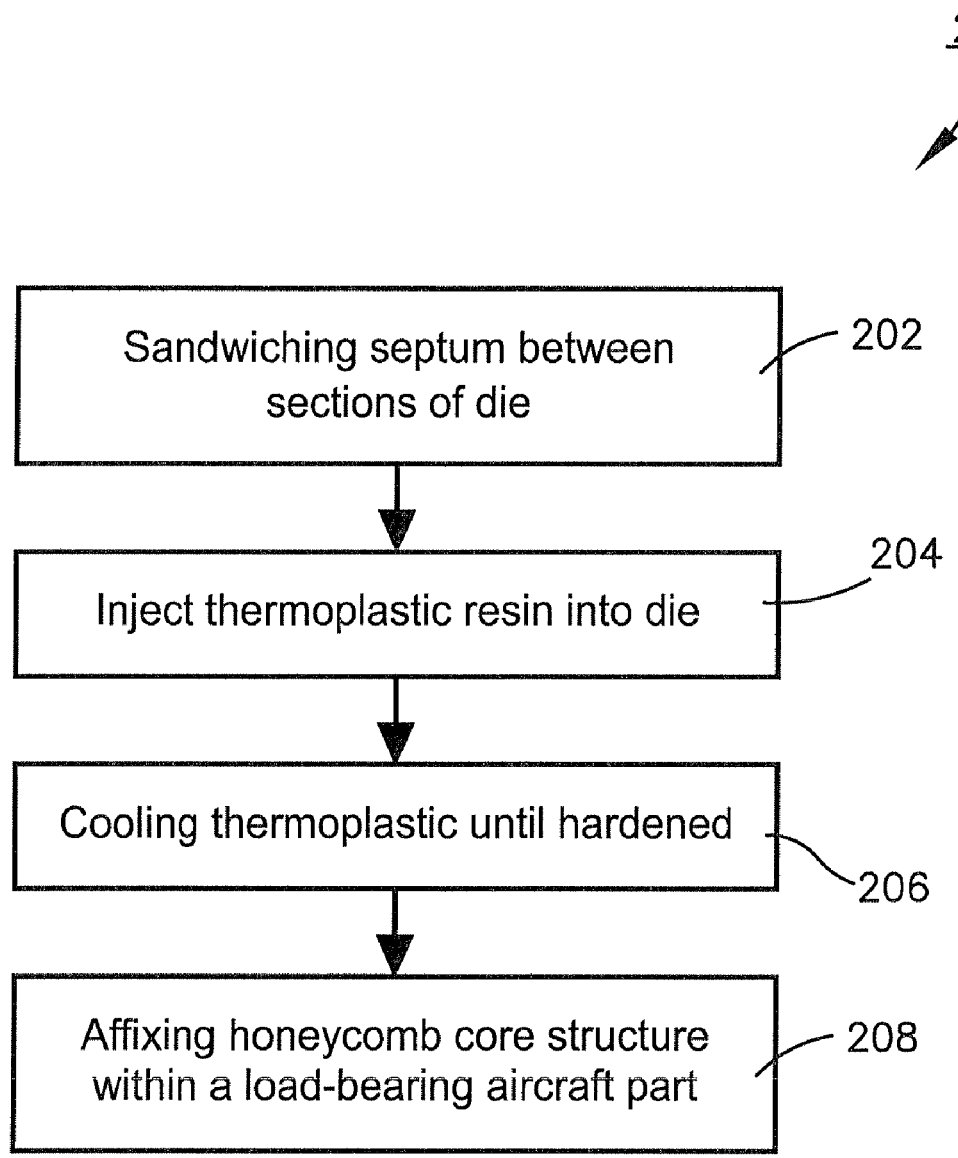
FIG. 3 is a flow chart illustrating method steps for forming and using the honeycomb core structure of FIG. 1 according to an embodiment of the invention.

An exemplary embodiment of a method 200 of fabricating and using the honeycomb core structure 10 is illustrated in FIG. 3. The method may comprise sandwiching the septum 14 between the two sections 18,20 of the die 16, as depicted in step 202. In this step, the septum 14 may be placed substantially perpendicular relative to the columns 26 and may be situated in physical contact with the end portions 28 of the columns 26. Alternatively, the septum 14 may mate with the columns 26 at any angle. The method may further comprise injecting melted thermoplastic resin into both sections 18,20 of the die 16, as depicted in step 204. The melted thermoplastic resin may be injected into the die 16 such that the thermoplastic resin substantially fills the space between the columns 26. The heat from the thermoplastic may allow portions of the septum 14 in contact with the thermoplastic to melt and therefore be integrated with the septum 14. In this way the septum 14 and the thermoplastic that forms the honeycomb core 12 are integrated with each other and bond together as they cool and harden, as in step 206, resulting in the honeycomb core structure 10.

The method may also comprise the step of affixing the honeycomb core structure 10 within an aircraft structure such that the honeycomb core structure 10 may provide a structural load path for a primary component of the aircraft, as depicted in step 208. The primary component of the aircraft may be any component that has substantial weight or substantial forces applied thereto during operation and flight of the aircraft. For example, the honeycomb core structure 10 may be a central component of an aircraft fan duct surrounding the aircraft's engine.

Although the invention has been described with reference to the embodiments illustrated in the attached drawings, it is noted that equivalents may be employed and substitutions made herein without departing from the scope of the invention as recited in the claims.

Having thus described an embodiment of the invention, what is claimed as new and desired to be protected by Letters Patent includes the following:

1. A method of fabricating and using a honeycomb core structure for aircrafts, the method comprising:
   sandwiching a septum between two sections of a die, wherein each section of the die is comprised of a plurality of spaced apart columns having end portions positioned substantially adjacent the septum;
   injecting melted thermoplastic resin throughout both sections of the die between the columns such that heat from the melted thermoplastic resin melts portions of the septum in contact with the melted thermoplastic resin; and
   cooling the thermoplastic resin until it is hardened, such that the honeycomb core structure comprises the hardened thermoplastic resin integrated with the septum.

2. The method of claim 1, wherein the spaced apart columns each have a substantially hexagonal cross-section.

3. The method of claim 1, wherein some of the columns are of a different size than others of the columns.

4. The method of claim 1, wherein the septum is a thin layer of material configured to substantially attenuate sound waves.

5. The method of claim 1, wherein the septum is comprised of woven thermoplastic, metals, or cloth.

6. The method of claim 1, wherein the septum has a lower melting temperature than the thermoplastic resin.

7. The method of claim 1, further comprising the step of affixing the honeycomb core structure within an aircraft structure such that the honeycomb core structure provides a structural load path for a primary component of the aircraft.

8. The method of claim 1, wherein the thermoplastic resin is a liquid crystalline polymer.

9. The method of claim 1, wherein the thermoplastic resin has a modulus greater than 3,000,000 pounds per square inch.

10. The method of claim 1, wherein the thermoplastic resin has a heat deflection temperature above 300 degrees Fahrenheit.

11. The method of claim 1, wherein each section of the die comprises a base portion from which the columns extend.

12. The method of claim 11, wherein the base portion of at least one of the sections of the die has a substantially curved surface.

13. A method of fabricating and using a honeycomb core structure for aircrafts, the method comprising:
   sandwiching a septum between two sections of a die, wherein each section of the die is comprised of a plurality of spaced apart columns arranged substantially perpendicular to the septum, wherein the columns each have a substantially hexagonal cross-section;
   injecting melted thermoplastic resin throughout both sections of the die between the columns such that heat from the melted thermoplastic resin melts portions of the septum in contact with the melted thermoplastic resin;
   cooling the thermoplastic resin until it is hardened, such that the honeycomb core structure comprises the hardened thermoplastic resin integrated with the septum; and
   affixing the honeycomb core structure within an aircraft structure such that the honeycomb core structure provides a structural load path for a primary component of the aircraft.

14. The method of claim 13, wherein the septum is comprised of woven thermoplastic, metals, or cloth.

15. The method of claim 13, wherein the septum has a lower melting temperature than the thermoplastic resin.

16. The method of claim 13, wherein the thermoplastic resin is a liquid crystalline polymer.

17. The method of claim 13, wherein the thermoplastic resin has a modulus greater than 3,000,000 pounds per square inch and a heat deflection temperature above 300 degrees Fahrenheit.

18. The method of claim 13, wherein each section of the die comprises a base portion from which the columns extend.

19. The method of claim 18, wherein the base portion of at least one of the sections of the die has a substantially curved surface.

* * * * *